(12) United States Patent
Leigh et al.

US010795100B2

(10) Patent No.: US 10,795,100 B2
(45) Date of Patent: Oct. 6, 2020

(54) REMOVABLE TRANSCEIVER MODULE

(71) Applicant: HEWLETT PACKARD ENTERPRISE DEVELOPMENT LP, Houston, TX (US)

(72) Inventors: Kevin B. Leigh, Houston, TX (US); Sunil Rao Ganta Papa Rao Bala, Cypress, TX (US); Arlen L Roesner, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/916,819

(22) Filed: Mar. 9, 2018

(65) Prior Publication Data

US 2019/0278037 A1    Sep. 12, 2019

(51) Int. Cl.
| | | |
|---|---|---|
| G02B 6/36 | (2006.01) |
| G02B 6/38 | (2006.01) |
| G02B 6/42 | (2006.01) |
| E05C 3/14 | (2006.01) |
| H01R 12/70 | (2011.01) |
| G06F 13/40 | (2006.01) |
| G06F 1/18 | (2006.01) |

(52) U.S. Cl.
CPC .............. *G02B 6/4261* (2013.01); *E05C 3/14* (2013.01); *G02B 6/4268* (2013.01); *G02B 6/4284* (2013.01); *G02B 6/4292* (2013.01); *G06F 1/183* (2013.01); *G06F 1/185* (2013.01); *G06F 13/409* (2013.01); *G06F 13/4068* (2013.01); *H01R 12/7005* (2013.01); *G02B 2006/4297* (2013.01)

(58) Field of Classification Search
CPC .. G02B 6/4261; G02B 6/4268; G02B 6/4284; G02B 6/4292; G02B 2006/4297; E05C 3/14; H01R 12/7005
USPC ........................... 385/53, 65, 75, 81, 83, 92
See application file for complete search history.

(56) References Cited

U.S. PATENT DOCUMENTS

| | | |
|---|---|---|
| 6,666,484 B1 | 12/2003 | Branch et al. |
| 6,771,511 B2 | 8/2004 | Bui |
| 7,255,490 B2 | 8/2007 | Zhang et al. |
| 8,534,930 B1 | 9/2013 | Lima |
| 9,354,405 B2 | 5/2016 | Yeh |

(Continued)

FOREIGN PATENT DOCUMENTS

| | | |
|---|---|---|
| JP | 2008225134 A | 9/2008 |
| WO | WO-2016085501 A1 | 6/2016 |

*Primary Examiner* — Kaveh C Kianni
*Assistant Examiner* — Hung Q Lam
(74) *Attorney, Agent, or Firm* — Hewlett Packard Enterprise Patent Department

(57) ABSTRACT

Examples relate to a removable transceiver module that comprises a base frame installable in a rail-pair receptacle that surrounds a first connector in a system board. It further comprises a module base board, a second connector attached thereto and a lever handle pivotally attached to the base frame and coupled to the module base board. The transceiver module is installed in the rail-pair receptacle in response to a lateral movement of the base frame to the receptacle to align the first and second connectors. The lever handle is movable between a closed position to couple the second connector to the first connector and an open position to install the transceiver module into the receptacle. This lever handle determines a vertical move of the module base board between the closed position and the open position.

15 Claims, 10 Drawing Sheets

(56) References Cited

U.S. PATENT DOCUMENTS

| | | |
|---|---|---|
| 2003/0141090 A1 | 7/2003 | Kruger et al. |
| 2005/0036743 A1 | 2/2005 | Dugas |
| 2005/0220425 A1 | 10/2005 | Kropp et al. |
| 2014/0353264 A1* | 12/2014 | Venugopal .......... H05K 7/1487 |
| | | 211/41.17 |

* cited by examiner

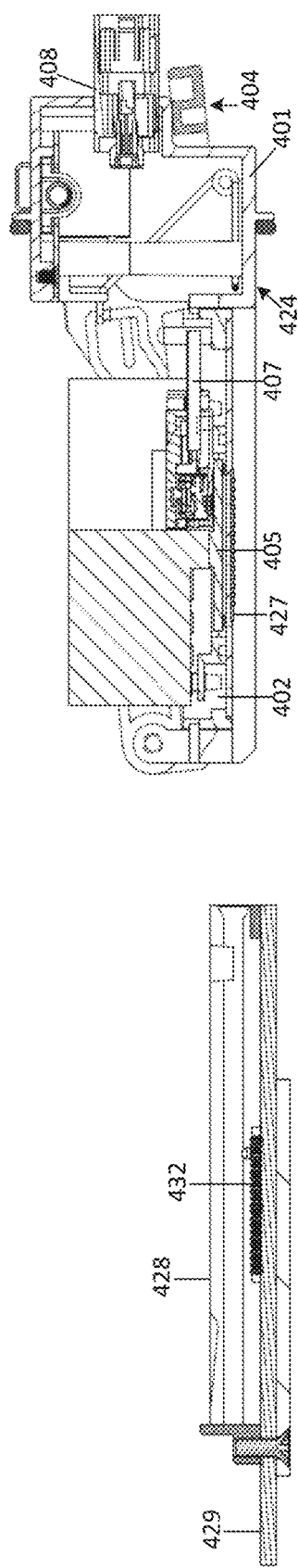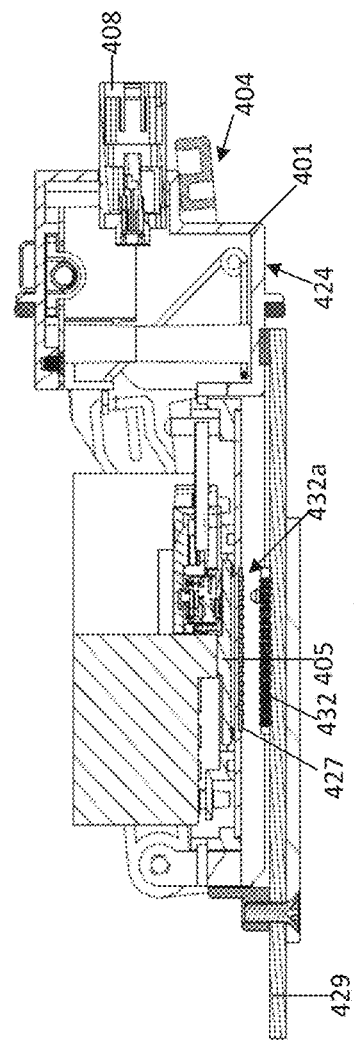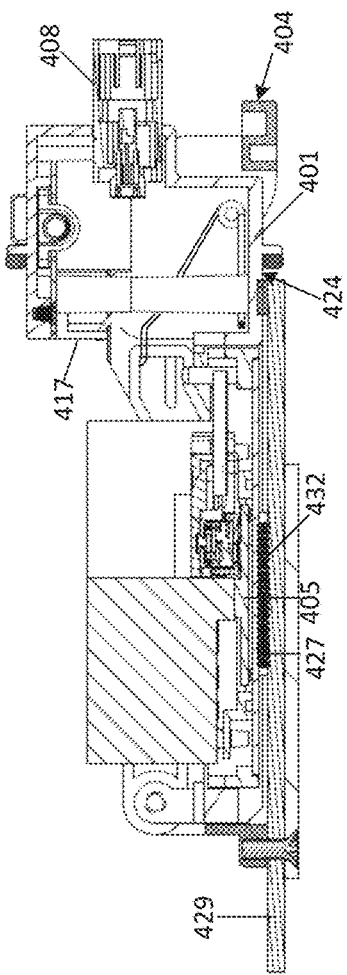

REMOVABLE TRANSCEIVER MODULE

BACKGROUND

Computing systems may include a system board with a number of socket connectors to couple module boards to the system board. The module boards can be hot-pluggable transceiver modules used for network data communications that in turn may comprise processors. The system board may be behind a system faceplate of the computing system and the socket connectors may be located in correspondence with opening in the system faceplate.

BRIEF DESCRIPTION OF THE DRAWINGS

Features of the present disclosure are illustrated by way of example and not limited in the following figure(s), in which like numerals indicate like elements, in which:

FIG. 4A is a cross sectional view of the example system of FIG. 3A.

FIG. 4B is a cross sectional view of the example system of FIG. 3A with the removable transceiver module partially inserted into the rail-pair receptacle and with the lever handle in its open position.

FIG. 4C is a cross sectional view of the example system of FIG. 3C.

DETAILED DESCRIPTION

Figure 1:
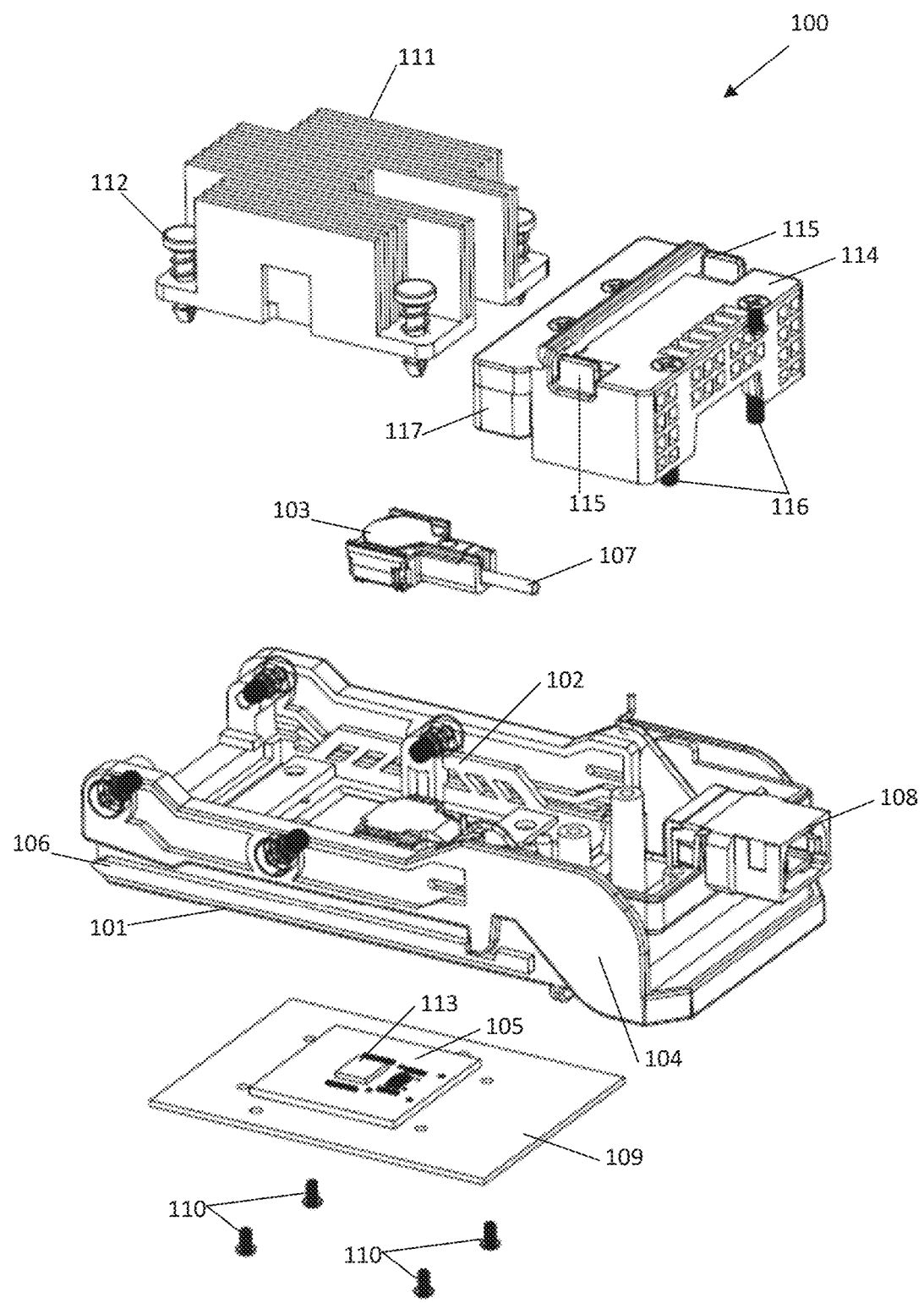
FIG. 1 is an exploded view of an example removable transceiver module.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

A transceiver module comprises a set of components for receiving communication signals from a first side of the module, a set of components for transmitting communication signals to the first side of the module, a set of components for transmitting communication signals to a second side of the module, and a set of components for receiving communication signals from the second side of the module. The transmitting and receiving components for the first and second sides of the module may be electrical, optical or electro-optical components.

Hot-pluggable transceiver modules, such as C form-factor pluggable (CFP), Small form-factor pluggable (SFP), etc., are difficult to cool and occupy a significant amount of space on a system board. This may limit the use of other electronic components on the same system board, may increase the cooling resources that should be implemented in the transceiver or the system board and may further increase the energy consumption of the device in which the system board is coupled, for example in a switch device. The transceiver modules may be coupled to a system board via right-angle electrical blindmate connectors, which also occupies significant space on a system board and prevents vertical stacking of transceiver modules, thereby limiting the implementation of high lane-count transceivers (e.g., beyond 8 lanes). Traditional use of right-angle electrical blindmate connectors in conjunction with relatively long trace lengths on transceiver module base board require signal conditioning devices on system board or on transceiver module base board for high-speed signals (e.g., beyond 25 Gbps/lane), thus increasing power consumption, board real estate and implementation cost.

Transceiver modules may be hot-pluggable transceiver modules. Said hot-pluggable transceiver modules can be easily replaced for different transceiver modules providing different services or for different transceiver modules having different lane-counts.

Transceiver modules may comprise heat generating devices attached thereof, such as processors, computing elements and other electronic devices, and a simple thermal management system including heat sinks. Heat sinks may be positioned in contact with heat generating devices to transfer this heat into the surrounding air. The system board to which the transceiver modules are attached may comprise cages in which the transceivers modules are inserted and the transceivers may be protected by covers that may partially or completely cover the heat generating devices of the transceiver. These cages and covers may difficult cooling operation of the heat generating devices since the cages and covers does not allow heated air to be removed by any internal, such a heat sink, or external, for example a fan or a liquid cooling mechanism, cooling system.

In addition, actuated-lever pluggable transceiver modules may have a lever-action mechanism located within the cage that is attached to the system board of the computing device, for example a switch, such that when the transceiver module is inserted into the cage, the carrier receiving the transceiver module can be vertically actuated by the lever-action mechanism to connect the connector of the transceiver module to the connector in the system board. However, having the lever-action mechanism enclosed within the cage is complex and burdens cost because worst-case conditions have to be addressed to pre-implement the mechanism. In addition, embedding moving parts within the system also negatively impact reliable operation of the total system.

A removable transceiver module that avoids usage of a cage attached to the system board of the computing device and a cover covering the heat generating devices of the transceiver module, for example the processing units, connectors, etc., is provided herein. The removable transceiver module may comprise a base frame installable in a rail-pair receptacle that may, at least, partially surround a first connector in a system board. It may further comprise a module base board, coupled to a base board carrier, and a second connector attached to the module base board and a lever handle pivotally attached to the base frame and coupled to the base board carrier. The removable transceiver module may be installed in the receptacle in response to a lateral movement of the base frame relative to the receptacle to align the second connector with the first connector. In addition, the lever handle may be movable between a closed position to couple the second connector to the first connector and an open position to install the removable transceiver module into the receptacle, the lever handle determining a vertical movement of the module base board between the closed position and the open position. As used herein, the term "vertical direction" may refer to a direction orthogonal to the plane of the removable transceiver module's base board and the term "lateral movement" may refer to a movement in a parallel plane axis to the system board.

In some examples, the removable transceiver module may be a high lane-count optical transceiver module, e.g., 16 lanes, 24 lanes, 32 lanes, etc. that has relatively large pin-count, i.e., large number of electrical pins to interface power, management and data signals to the system. In other examples, the removable module may be a computing device, e.g., SoC (System-on-Chip), GPU (Graphic Processing Unit), or AI (Artificial Intelligence) accelerator chip that has large pin count. In some examples, the computing device may consume tens of watts of power that require large heat extraction device such as heat sink.

The rail-pair receptacle receiving the removable transceiver module may be an open structure, not having a cage to cover the removable transceiver module once inserted therein, having longitudinal guide rails in which guides located at both of sides of the base frame are inserted. For example, the rail-pair receptacle may be a contoured, e.g., U-shaped, receptacle with guide rails located at both of its sides. Said guide rails may comprise an opening at one of its ends to receive the guides of the base frame, and a closed end at the opposite end of the guides for the base frame to abut against. In another example, the rail-pair receptacle may comprises two guide rails in a parallel position to accept a removable transceiver module on one end and a stop feature positioned at the distal end of the guide rails.

The removable transceiver module may have a cooling mechanism, e.g., a heat sink, located in contact with the heat generating devices. The removable transceiver module may not have a cover covering the cooling mechanism facilitating heat removal. For example, a fan within the computing device in which the removable transceiver module is installed may generate an air flow for removing heated air form the heat sink. In addition, the receptacle may not have a cage to house the removable transceiver module which also avoid blocking air flow through the removable transceiver module.

In some examples, the lever handle may be a contoured lever handle, for example a U-shaped lever handle, comprising one arm located at each side of the base frame and pivotally attached to the base frame by its ends and an actuating portion joining both arms by its opposite end. Having the lever handle attached to the base frame of the removable transceiver module allows proper mechanism to hold, latch and unlatch a specific transceiver module. Since the lever handle and corresponding mechanism comes along with the transceiver module instead of being coupled to the cage, all the moving parts are not pre-provisioned in the system, avoiding cost burden to the system. In addition, the transceiver module along with the moving parts can be replaced increasing overall system reliability.

FIG. 1 describes a removable transceiver module 100 that comprises a base frame 101 installable in a receptacle that at least partially surrounds a first connector coupled to a system board (not shown in this figure). It also comprises a base board carrier 102, a second connector (not shown in this figure) attached to the underside of the base board 109 and a lever handle 104 pivotally attached to the base frame 101 and coupled to the base board carrier 102. The second connector may be an electrical or electro-optical connector to deliver power to the removable transceiver module 100, and to transmit and receive communication signals from/to the system board on which the removable transceiver module 100 is installed. The removable transceiver module 100 is to be installed on the receptacle in response to a lateral movement of the base frame 101 relative to the receptacle such that the second connector and a first connector (not shown in the figure) are aligned. In addition, the lever handle 104 is movable between a closed position (down position) in which the second connector and the first connector are coupled, and an open position (up position) in which the second connector and the first connector do not contact to each other. The open position of the lever handle 104 also allows installation of the removable transceiver module 100 into the receptacle of the system board while the closed position of the lever handle 104 prevents said installation. By actuating the lever handle 104, a vertical movement of the base board carrier 102 is determined, said vertical movement being defined between the closed position and the open position of the lever handle 104. Thus, the second connector moves in a vertical axis relative to the first connector.

The lever handle 104 comprises an elevation-lock mechanism that comprises a lever handle spring. The handle lever spring exerts a force on the lever handle 104 vertically moving it to its open position (upward position).

The base frame 101 comprises guides 106 on its sides which are received by guide rails of the receptacle in the system when the removable transceiver module 100 is inserted into the cited receptacle of the system board.

The removable transceiver module 100 further comprises a module substrate 105, for example an electrical or electro-optical transceiver board, attached to a module base board 109. The second connector, that is attached underside of the module base board 109 to interface to the first connector on the system board, may be an electrical or electro-optical connector and may be electrically or electro-optically coupled to transceiver devices enclosed within the transceiver module 100, respectively. An electrical or optical pod 103 coupled to a corresponding electrical or optical cable 107 connects to an electrical or optical end connector 108, respectively. This end connector 108 may comprise interface signals for example for an Ethernet network, an InfiniBand fabric, a Gen-Z fabric connector, an NVLink GPU communication link, etc., to communicatively couple the removable transceiver module 100 to any other external system, network or device. The module substrate 105 is communicatively coupled to a socket contact assembly of the second connector by interposition of the module base board 109. Said socket contact assembly may comprise connectors, such as spring-contact connectors, on its underside surface to contact to connectors of a respective socket contact board of the first connector. The module base board 109 is attached to the base board carrier by screws 110, although any other attaching element may be used.

The removable transceiver module 100 also comprises a heat sink 111 attached to the module base board 109, for example, by using four spring-actuated plastic push rivets 112. The heat sink 111 is to remove heat generated by heat generating elements attached to the module substrate 105, such as the processing unit 113, or any transceiver device enclosed within the transceiver module 100. In one example, the module substrate 105 may not have enough mechanical structure for the heat sink 111 to be mechanically coupled to, and thus the processing unit 113 on the module substrate 105 on the module base board 109 is thermally coupled to the underside of the heat sink 111 while the heat sink 111 is mechanically coupled to the base board carrier 102. A front cover 114 is further attached to the base frame 101 by four screws 116. The front cover 114 partially covers the base frame 101 but does not cover the heat sink 111 and the lever handle 104. The front cover 114 comprises latch buttons 115 connected to respective retention elements 117 located at both sides of the front cover 114. When the latch buttons 115, that are connected to each other by a spring (not shown in this figure), are inwardly pressed the retention elements 117 are inwardly moved. Then, the retention elements 117 define an inwardly position that allows the lever handle 104 to freely move between its closed position and open position. When the pressure in the latch buttons 115 stops, the retention elements 117 define an outwardly position in which the latch buttons 115 and the retention elements 117 move outwardly. In this outwardly position, the retention elements 117 retain the lever handle 104 in its closed position by protruding over the upper edge of the lever handle 104.

Figure 2A:
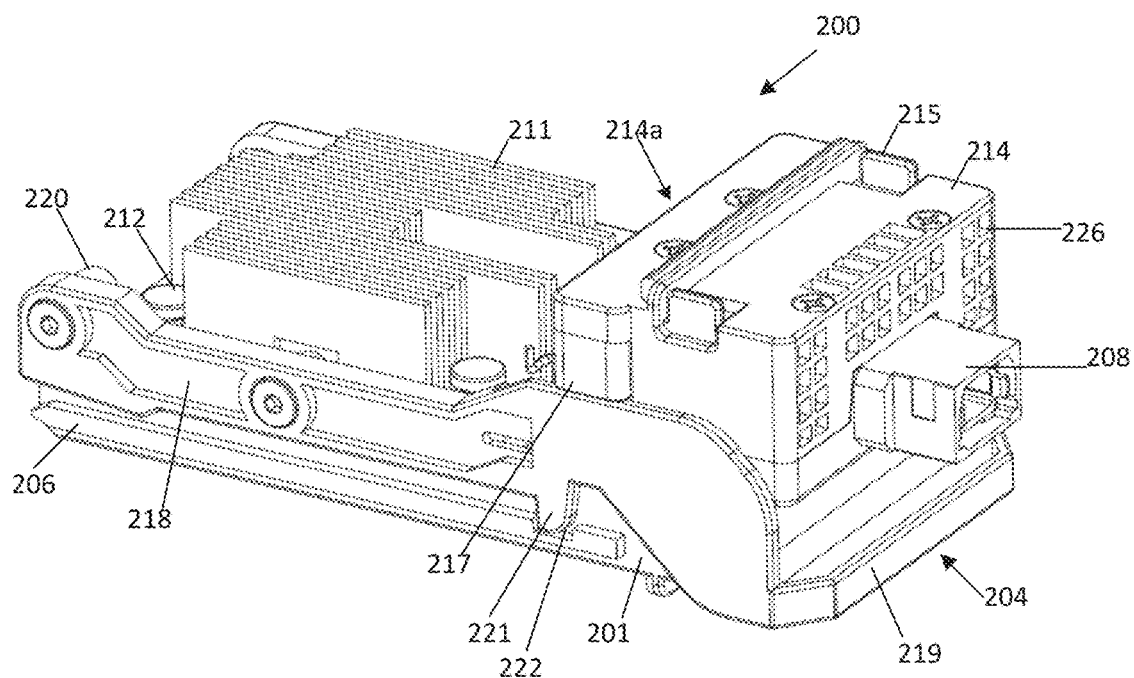
FIG. 2A-2E illustrates different views of the removable transceiver module of FIG. 1.
Figure 2B:
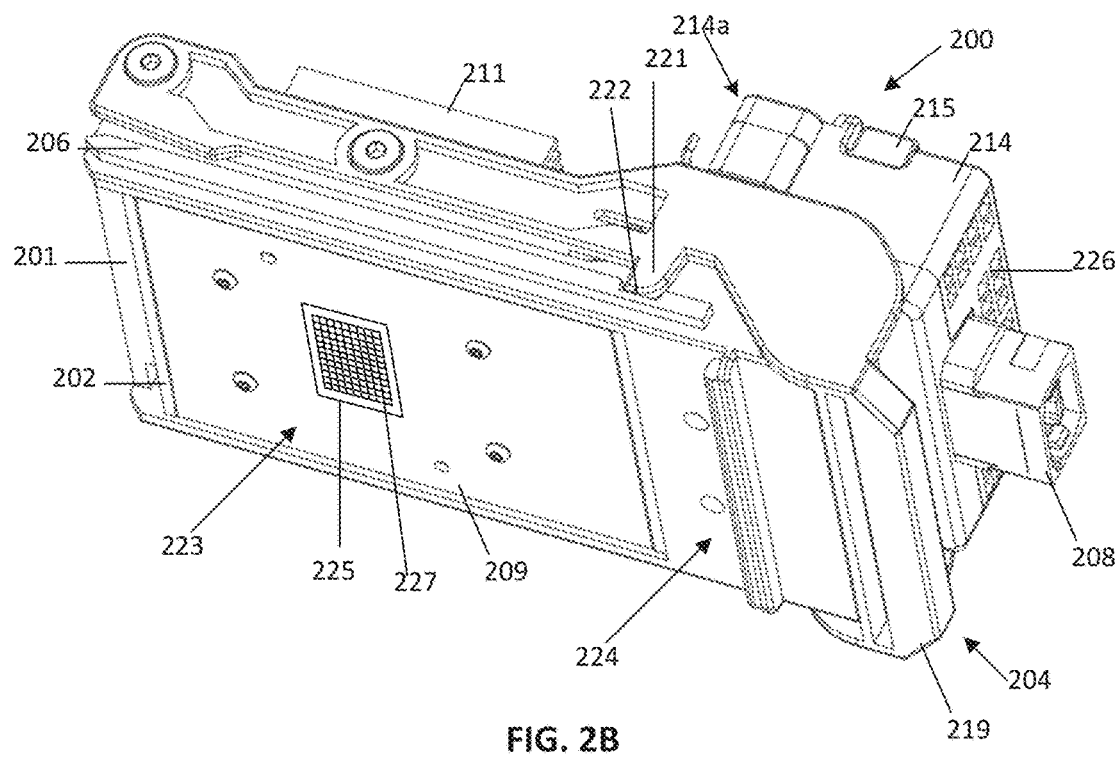
Figure 2C:
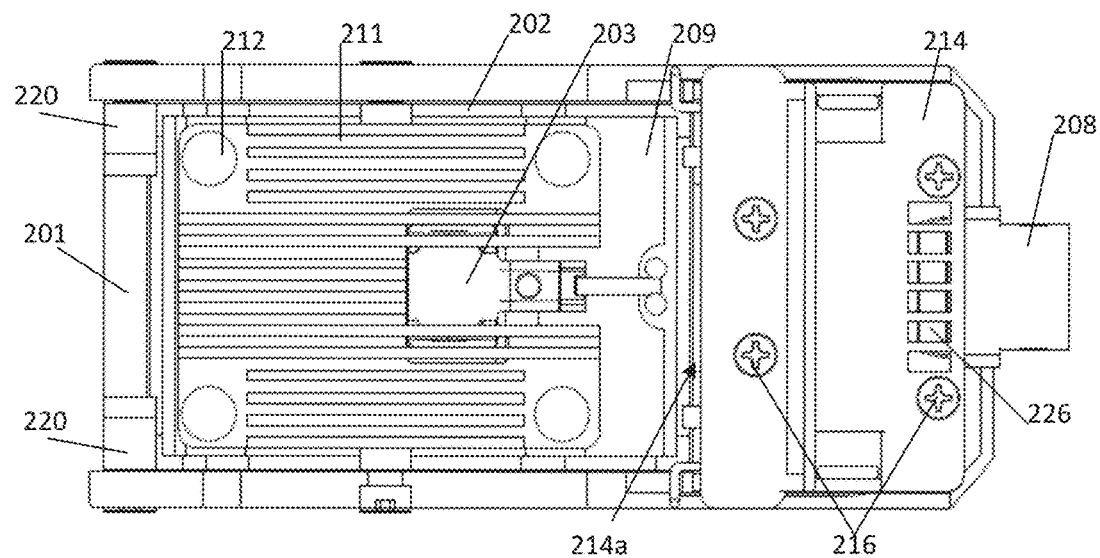
Figure 2D:
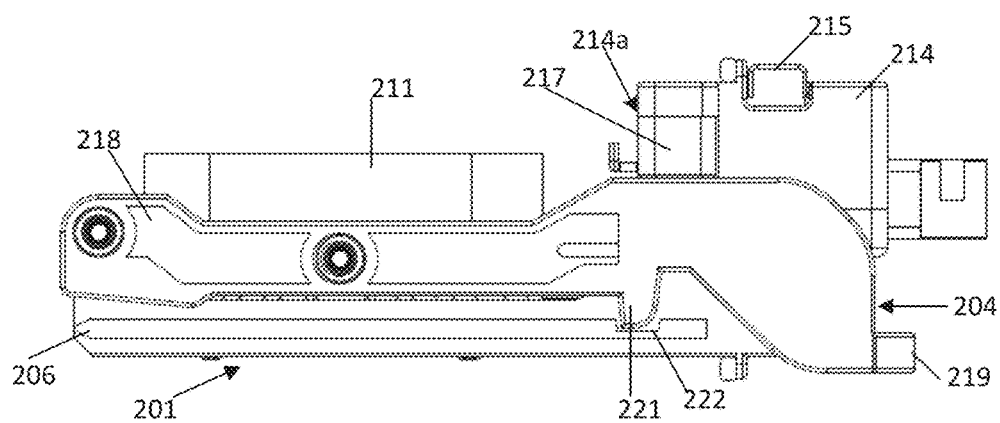
Figure 2E:
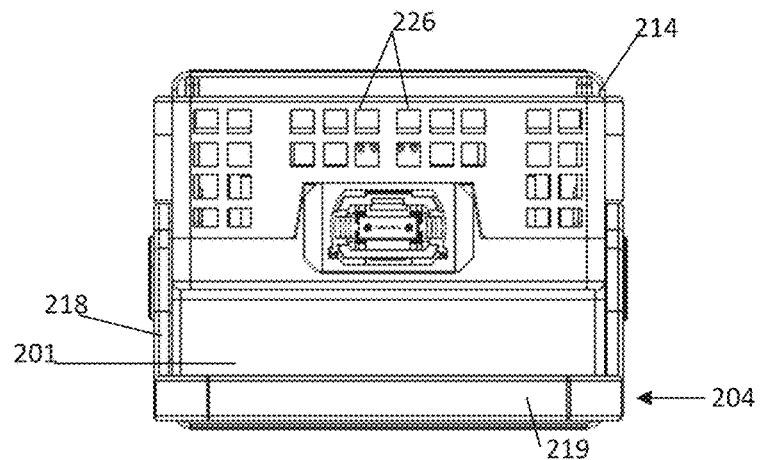

FIG. 2A illustrates a perspective top view and FIG. 2B illustrates a perspective bottom view of the removable transceiver module 200 (100 of FIG. 1) with its lever handle 204 in its closed position. In addition, FIG. 2C illustrates a top view, FIG. 2D illustrates a side view and FIG. 2E illustrates a rear view of the same removable transceiver module 200. The lever handle 204 in its open position allows installation of the removable transceiver module 200 into the receptacle of the system board. In particular, the elevation-lock mechanism of the removable transceiver module 200 maintains a consistent elevation of the lever handle 204 above the system board during the lateral insertion of the removable transceiver module 200 in the receptacle, allowing enough clearance for the socket contact assembly 227 of the second connector 225 from the system aperture. In one example, the socket contact assembly 227 may comprise protruding contacts, for example LGA (land grid array) spring contacts, attached to the module base board 209. These contacts are for hot-blindmating with the electric or optical contacts of the complementary socket contact assembly of the first connector in the system board (not shown in this figure). In some other examples, the socket contact assembly 227 may comprise contact pads instead of protruding contacts. The second connector 225 may comprise alignment features that may be complementary to blindmate alignment features of the first connector.

The base frame 201 has a rectangular shape determining a first area 223 that defines a void in which the module base board 209 fits and a second area 224 corresponding to the front cover 214. This second area 224 may house external connector and cable management, such as optical fibers and optical connectors to optically couple to the module substrate, or signal conditioning devices for electrical cables and electrical connectors to electrically couple to the module substrate 205. The lever handle 204 is U-shaped with its ends pivotally attached to respective arms 220 of the base frame 201. The U-shaped lever handle 204 comprises one arm 218 located at each side of the base frame 201 and an actuating portion 219 joining both arms 218. This actuating portion 219 remains outside the computing device in which the removable transceiver module 200 is inserted so it can be manually actuated by a user to install/de-install the module 200. The U-shaped lever handle 204 is contoured in such a way that it may be moved to its either closed position or open position without interfering with the end connector 208 and an external cable (not shown).

The arms 218 of the lever handle 204 comprise respective protrusions 221 that, with the lever handle 204 in its closed position, abut against the bottom surface of respective recesses 222 in the guides 206. This abutment limits the vertical movement of the base board carrier 202 until the contacts of the socket contact assembly 227 of the second connector 225 contact the contacts of the first connector.

The front cover 214 comprises a plurality of ventilation holes 226 to allow heated air to escape from the removable transceiver module 200. For example, an air flow generated by a fan within the computing device in which the removable transceiver module 200 is installed may pass through the fins of the heat sink 211 pushing the heated air towards the front cover 214. The heated air may entry into the front cover 214 through an opening in its inner wall 214a and exiting through the ventilation holes 226. Heat generated by other transceiver devices that may be located within the cavity defined by the second area 224 of the base frame 201 and the front cover 214 may be removed by the same air flow. These ventilation holes 226 remains outside the computing device when the transceiver module 200 is installed. In an example, the base frame 201 may comprise a plurality of ventilation holes (not shown) to allow heated air to escape from the removable transceiver module. For yet another example, both the front cover 214 and the base frame 201 may comprise a plurality of ventilation holes (not shown) to allow heated air to escape from the removable transceiver module.

Figure 3A:
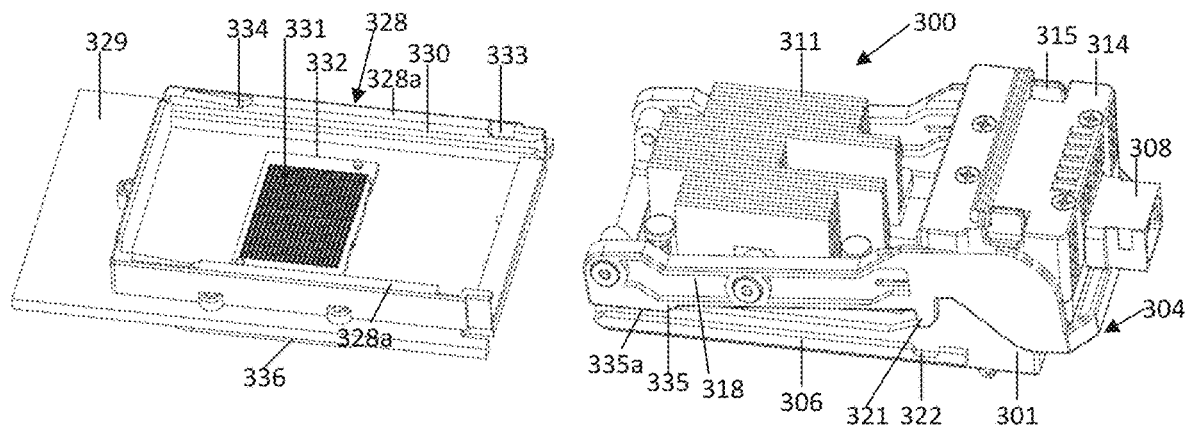
FIG. 3A illustrates a view of an example system with the removable transceiver module just prior to be installed into a receptacle.

FIG. 3A illustrates a view of an example system with the removable transceiver module 300 of FIG. 1 just prior to be installed into a rail-pair receptacle 328 attached to a system board 329 and with the lever handle 304 in its open position.

The rail-pair receptacle 328 comprises respective guide rails 330 along which the guides 306 of the base frame 301 are laterally inserted. The removable transceiver module 300 is to be installed in the rail-pair receptacle 328 in response to a lateral movement of the base frame 301 with respect to the rail-pair receptacle 328, such that the connectors of the socket contact assembly (not shown in this figure) are vertically aligned with the contacts of the socket contact board 331 of the first connector 332. The first connector 332 is attached on the topside of the system board 329 and supported by a bolster plate 336 on the underside of the system board 329. The first connector 332 may comprise blindmate alignment features that may be complementary to alignment features of the second connector.

The rail-pair receptacle 328 comprises first recesses 333 to house the protrusions 321 of the lever handle 304 when the removable transceiver module 300 is fully inserted into the rail-pair receptacle 328 and the lever handle 304 is in its closed position. Each first recess 333 interfaces with the upper edge of the rail-pair receptacle 328 with the corresponding guide rail 330 such that when the removable transceiver module 300 is fully inserted in the rail-pair receptacle 328 and the lever handle 304 is in its closed position, the side walls of the first recesses 333 avoid movement of the removable transceiver module 300 along the guide rails 330. The rail-pair receptacle 328 further comprises second recesses 334 to house, when the removable transceiver module 300 is fully inserted in the rail-pair receptacle 328 and the lever handle 304 is in its closed position, corresponding projections 335 of the arms 318 of the lever handle 304. These projections 335, that are located in proximity to the free ends of the U-shaped lever handle 304, abut against the opening of the guide rails 330 avoiding the removable transceiver module 300 to be inserted in the rail-pair receptacle 328 when the lever handle 304 is in its closed position.

Figure 3B:
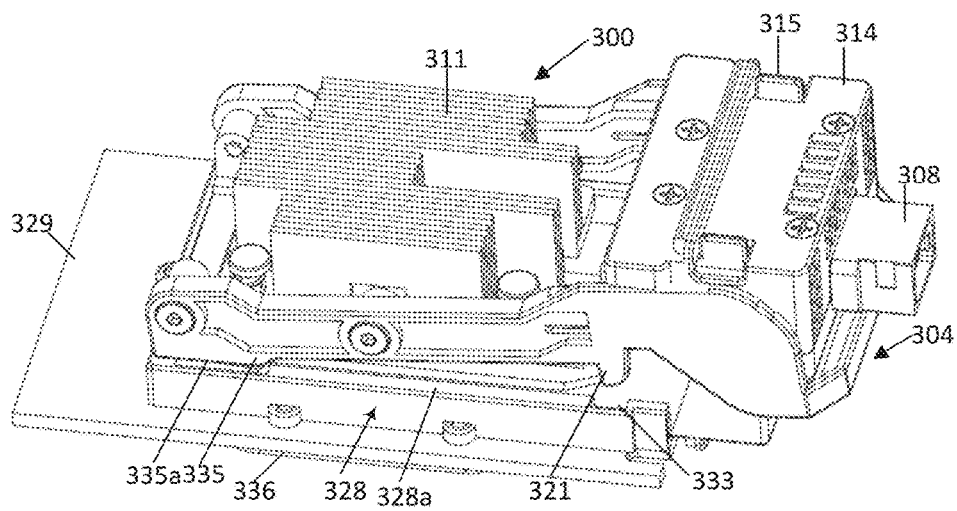
FIG. 3B illustrates a view of the example system with the removable transceiver module fully inserted into the rail-pair receptacle and with the lever handle in its open position.

FIG. 3B illustrates a view of the example system with the removable transceiver module 300 fully inserted into the rail-pair receptacle 328 and with the lever handle 304 in its open position. With the removable transceiver module 300 fully inserted into the rail-pair receptacle 328, the first connector 332 and the second connector are vertically aligned as long as the protrusions 321 with the first recesses 333 and the projections 335 with the second recesses 334, are respectively aligned.

Figure 3C:
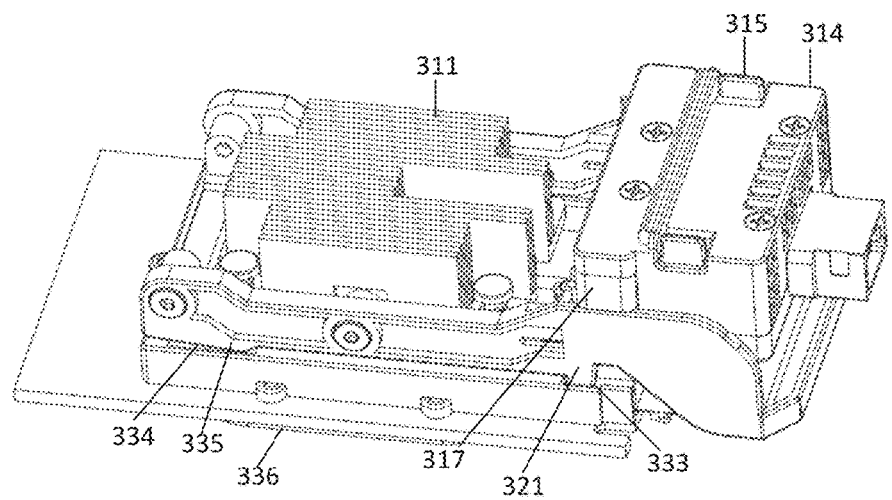
FIG. 3C illustrates a view of the example system with the removable transceiver module fully inserted into the rail-pair receptacle and with the lever handle in its closed position.

FIG. 3C illustrates a view of the example system with the removable transceiver module 300 fully inserted into the rail-pair receptacle 328 and with the lever handle 304 in its closed position. The lever handle 304 was forced to start in its open position as the removable transceiver module 300 is sliding in laterally along the guide rails 330, the bottom flat portion 335a of the projections 335 is slightly above and substantially parallel to the top surface flat portion 328a of the rail-pair receptacle 328. When the removable transceiver module 300 is fully inserted, the projections 335 can be dropped into the second recesses 334 allowing the lever handle 304 to be in the pushed down to be in its closed position as shown in FIG. 3C. The contacts of the second connector fully contact the contacts 331 of the first connector 332 such that power connection and transmission of data between both connectors is allowed. With the lever handle 304 in such closed position, the protrusions 321 are fully inserted into the corresponding first recesses 333 avoiding any movement of the removable transceiver module 300 that may affect data transmission. The latch buttons 315 and the retention elements 317 are in its resting locked position retaining the lever handle 304 in its closed position.

FIG. 4A is a cross sectional view of the example system of FIG. 3A. FIG. 4B is a cross sectional view of the example system of FIG. 3B with the removable transceiver module 400 partially inserted into the rail-pair receptacle 428 and with the lever handle 404 in its open position. FIG. 4C is a cross sectional view of the example system of FIG. 3C. There is a space 432a between the socket contact assembly 427 to which the second connector 425 is attached and the first connector 432, with the lever handle 404 in its open position, such that both connectors do not contact to each other. By actuating on the lever handle 404 downward, the base board carrier 402 is moved downward in its vertical axis until the contacts of the second connector 403 blindmate the contacts of the socket contact board of the first connector 432.

While the end connector 408 is shown in this example mounted on the bulkhead of the removable transceiver module 400 to allow external cable to be connected, the end connector 408 may be mounted on other walls of the removable transceiver module 400. For example, the end connector 408 may be mounted on the second area 424 of the base frame 401 and the system board 429 may comprise an additional connector (not shown in this figure) located in correspondence with this end connector such that when the removable transceiver module 400 is fully inserted into the rail-pair receptacle 428, the end connector 408 is connected to the additional connector of the system board 429.

Figure 5:
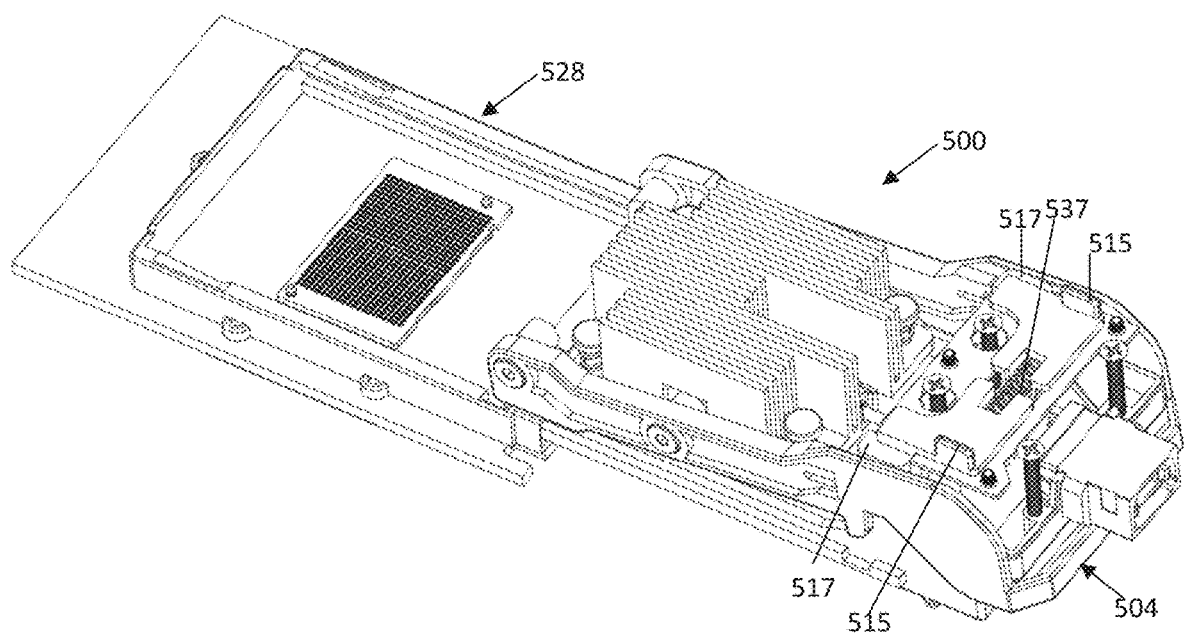
FIG. 5 illustrates a view of the example system of FIG. 3 with the removable transceiver module partially inserted into the rail-pair receptacle, the lever handle in its open position showing a pre-loaded spring inside the front cover.

FIG. 5 illustrates a view of the example system of FIG. 3 with the removable transceiver module 500 partially inserted into the rail-pair receptacle 528, having the lever handle 504 in its open position and showing a pre-loaded spring 537 inside the front cover (not shown in this figure). The latch buttons 515 form a single body with the respective retention elements 517 to which they are connected. These bodies are sized such that they abut to each other when the latch buttons 515 are inwardly pressed. The latch buttons 515 are connected to each other by interposition of the pre-loaded spring 537. Then, when a pressure is exerted on the latch buttons 515, the retention elements 517 define an inwardly position that allows the lever handle 504 to stay in its open position. When the lever handle 504 is moved to its closed position, the retention elements 517 are freed allowing the pre-loaded spring 537 to move the latch buttons 515 and the retentions elements 517 outwardly to recover its resting position. In said resting position, the retention elements 517 retain the lever handle 504 in its closed position by protruding over the upper edge of the lever handle 504.

Figure 6:
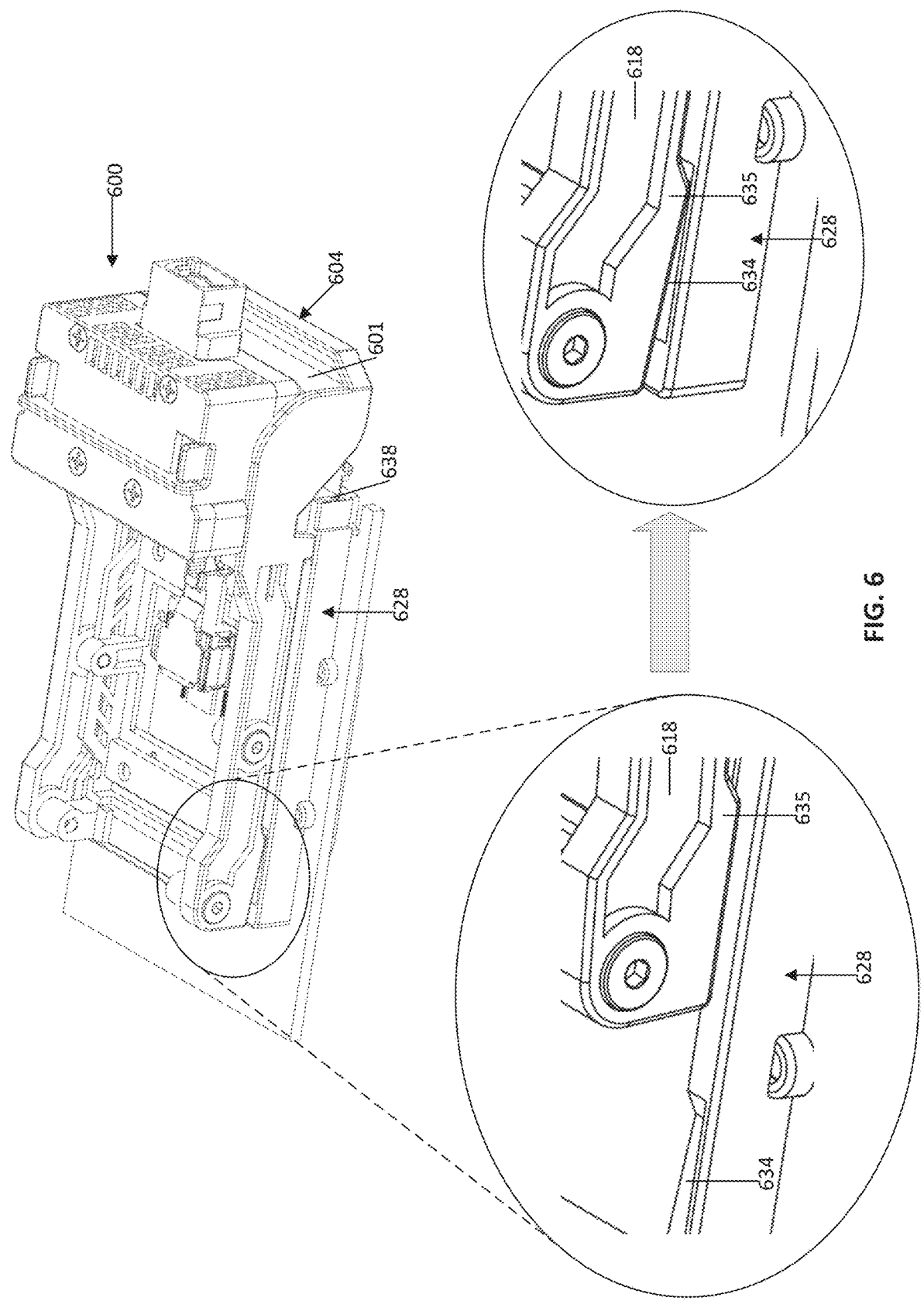
FIG. 6 illustrates an expanded view of the mechanism for allowing the removable transceiver module to be inserted in the rail-pair receptacle when the lever handle is in its closed position.

FIG. 6 illustrates an expanded view of the mechanism for allowing the removable transceiver module 600 to be inserted in the rail-pair receptacle 628 when the lever handle 604 is in its closed position.

The second recesses 634 in the rail-pair receptacle 628 are to house the projections 635 located in proximity to the free ends of the arms 618 of the lever handle 604 when the lever handle 604 is in its closed position (see expended right view) which in turns allows the elevation of the base frame 601 of the removable transceiver module 600 to be dropped to blindmate the second connector to the first connector. When the lever handle 604 is in its open position (see expanded left view), the projections 635 are positioned substantially parallel relative to the upper edge of the rail-pair receptacle 628 maintaining a consistent elevation above the system board. This allows inserting the base frame 601 into the rail-pair receptacle 628. However, if the lever handle 604 is in its closed position the projections 635 would abut against the upper edge of the openings 638 of the respective guide rails avoiding inserting the base frame 601 into the receptacle rail-pair 628.

Figure 7:
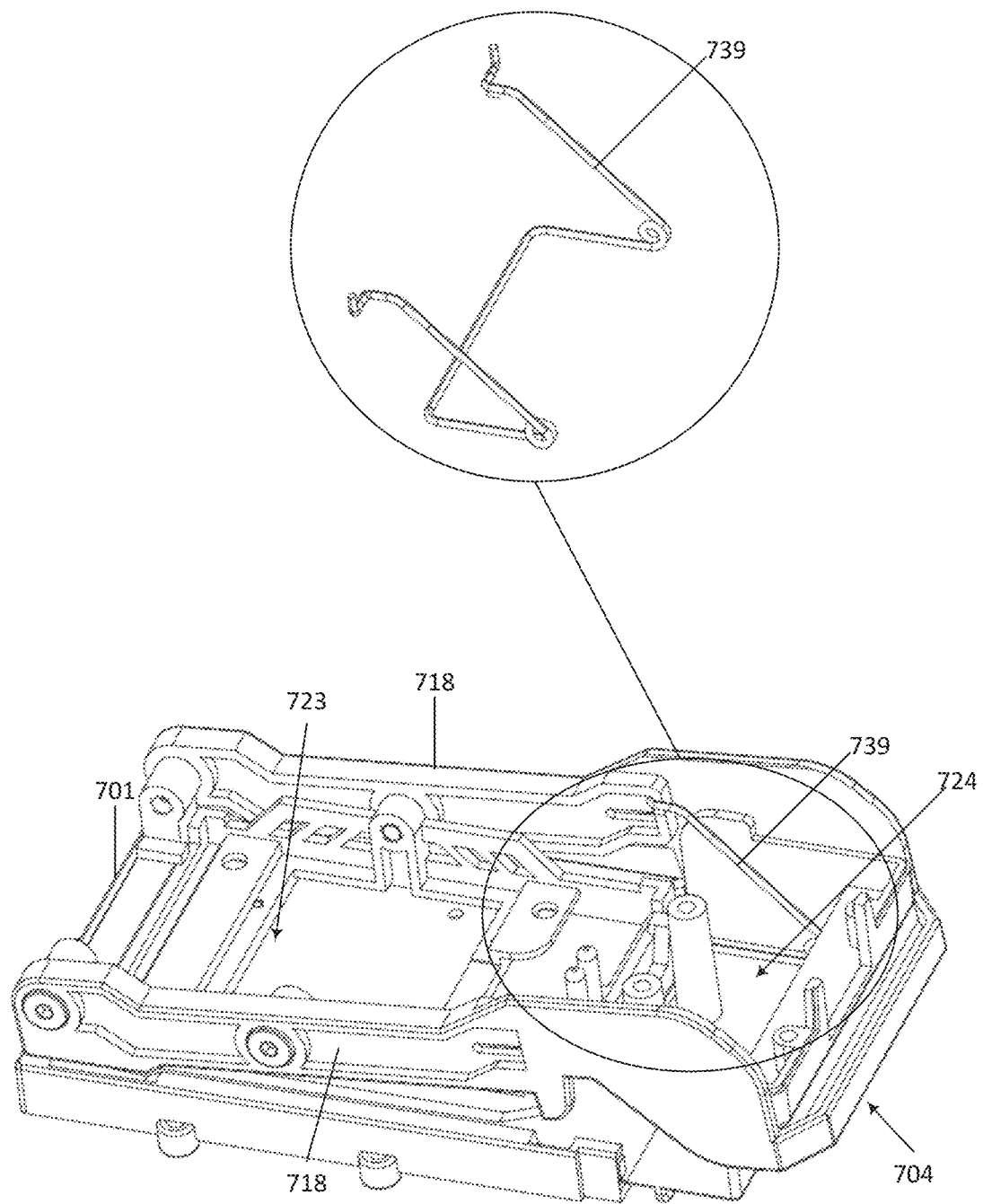
FIG. 7 illustrates expanded view of the pre-loaded lever handle spring that is to actuate the lever handle.

FIG. 7 illustrates expanded view of the pre-loaded lever handle spring 739 that is to actuate the lever handle 704. The pre-loaded lever handle spring 739, for example a wire form spring, is housed within the cavity defined by the front cover (not shown in this figure) and the second area 724 of the base frame 701. The pre-loaded spring 739 connects the second area 724 with both arms 718 of the lever handle 704 to hold the lever handle 704 in its open position. Therefore, pre-loaded lever handle spring 739 exerts a force to bias the lever handle 704 on its upward position. While FIG. 7 illustrates a lever handle spring with a particular shape, any other pre-loaded spring able to exert a force to bias the lever handle in its (upward) open position.

Figure 8:
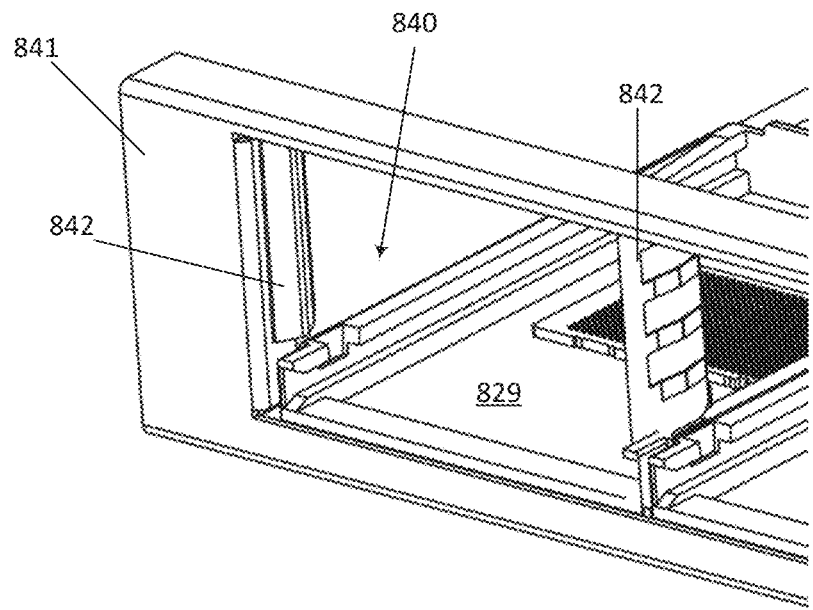
FIG. 8 is a perspective view of an aperture in a system faceplate of a computing device including gaskets to isolate the removable transceiver module from the external environment.

FIG. 8 is a perspective view of a system aperture 840 in a system faceplate 841 of a computing device including gaskets 842 to isolate the removable transceiver module, when inserted, from the external environment. Since the removable transceiver module (not shown in this figure) is not covered by a cover and there is not a cage attached to the system board 829, it is important to isolate the electronic and optical components of the removable transceiver module from dust and other contaminants coming from the external environment. The gaskets may also serve to contain EMI/RFI within the system. These gaskets 842 are attached to the side walls of the aperture 840. While FIG. 8 shows one gasket 842 attached to the side walls of the aperture, there may be gaskets attached to the top and bottom walls of the aperture. The aperture 840 may be covered with a removable sheet metal cover with retention clips (not shown) when a removable module is not installed.

Figure 9:
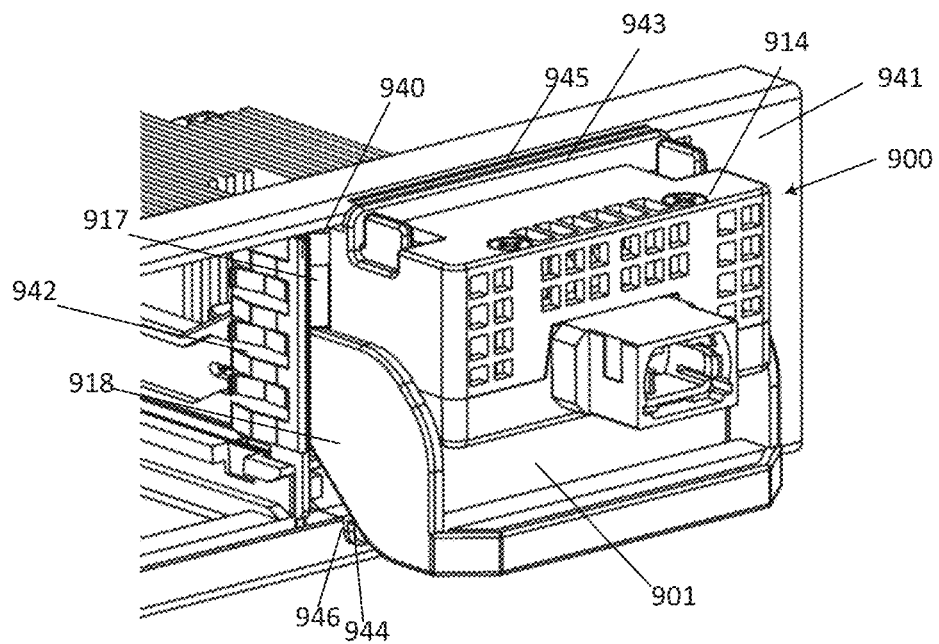
FIG. 9 is a perspective view of the aperture shown in FIG. 8 with the removable transceiver module fully inserted.

FIG. 9 is a perspective view of the aperture 940 shown in FIG. 8 with a removable transceiver module 900 fully inserted. In such example, the front cover 914 has an upper protrusion 943 along its top surface and the base frame 901 comprises a lower protrusion 944 along its lower surface located in correspondence with the upper protrusion 943. The upper protrusion 943 abuts against the upper wall of the aperture 940 by interposition of an upper gasket 945 and the lower protrusion 944 abuts against the lower wall of the aperture by interposition of a lower gasket 946. These gaskets 945,946 may be glued to the inner surfaces of the respective protrusions 943,944.

The retention elements 917, part of the front cover 914 and the arms 918 of the lever handle 904 abut against the side gaskets 942 of the aperture 940. The gaskets 945,946 in the upper and lower wall and the gaskets 942 in the side walls of the aperture 940 completely isolate the removable transceiver module 900 from the external dust and contaminant environment.

Figure 10:
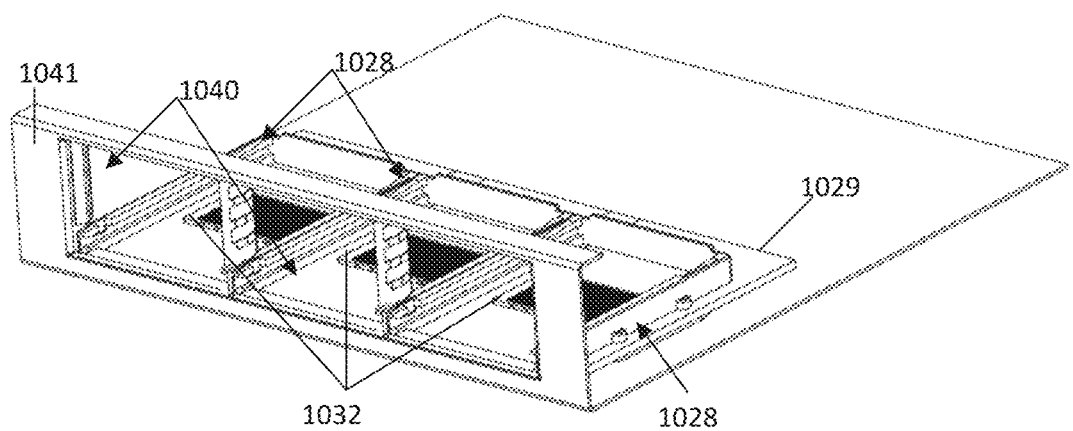
FIG. 10 illustrates a perspective view of an example system faceplate including three apertures for housing three removable transceiver modules.

FIG. 10 illustrates a perspective view of an example system faceplate 1041 including three apertures 1040 for housing three removable transceiver modules. Each of the receptacles 1028 are mounted on the system board 1029 in correspondence with an aperture 1040 in the system faceplate 1041 of a computing device, such as a server, storage module, switch, etc., and at least partially surrounding a respective first connector 1032, for example a socket connector. For example, the first connectors 1032 in the system board 1029 may be for coupling transceiver modules to which they are arranged. The apertures 1040 may be covered with corresponding removable sheet metal covers with retention clips (not shown) when removable modules are not installed.

Figure 11:
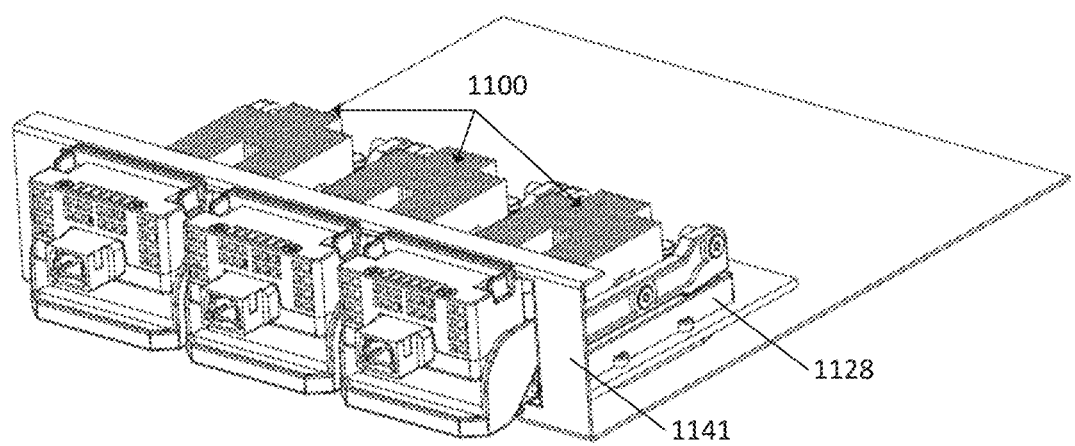
FIG. 11 illustrates a perspective view of the system faceplate of FIG. 10 including three removable transceiver modules fully inserted into the corresponding rail-pair receptacles.

FIG. 11 illustrates a perspective view of the system faceplate 1141 of FIG. 10 including three removable transceiver modules 1100 fully inserted into the corresponding receptacles 1128. The removable transceiver modules 1100 may all provide identical or different services to the computing device in which they are inserted. For example, one of the removable transceiver modules 1100 may be an optical transceiver with an MPO (Multi-fiber Push On) optical connector. For another example, one of the removable transceiver modules 1100 may be a GPU with an NVLink connector. For yet another example, a removable transceiver module may be a machine learning algorithm accelerator with a communication fabric interface connector.

While the example of FIG. 11 shows a system faceplate with 3 openings to house 3 removable transceiver modules, the system faceplate of an electronic device may comprise any number of opening for any number of transceiver modules.

Removable transceiver modules as described herein may be useful for minimizing complexity and cost on the system side by having most of the moving parts on the removable module, so, any potential problems or improvement of the moving parts can be addressed on the removable module without impacting the system. Moreover, the first connector and the second connector allow high-speed electrical pin-count mating with low loss. Open-top module allows ease of heat extraction and vent holes of the front cover allows ease of cooling. Front cover large area in conjunction with the U-shape handle allows various types and number of external connectors. All these benefits enable large lane-count high-bandwidth optical transceivers with flexible external connector options, high-power high-performance computing devices such as SoC, GPU and other accelerators.

What is claimed:

1. A removable transceiver module comprising:
   a base frame installable in a rail-pair receptacle that at least partially surrounds a first connector in a system board;
   a module base board and a second connector attached thereto; and
   a lever handle pivotally attached to the base frame and coupled to the module base board;
   wherein the removable transceiver module is to be installed in the receptacle in response to a lateral movement of the base frame with respect to the receptacle to align the second connector with the first connector;
   wherein the lever handle is movable between a closed position to couple the second connector to the first connector and an open position to install the removable transceiver module into the receptacle, the lever handle determining a vertical move of the module base board between the closed position and the open position; and
   wherein the lever handle is a contoured lever handle comprising:
   one arm located at each side of the base frame, each arm having one free end pivotally attached to the base frame; and
   an actuating portion joining both arms by their opposite end; and
   wherein the lever handle comprises projections that, with the lever handle in its closed position, are positioned to abut against the rail-pair receptacle avoiding insertion of the removable transceiver module into the rail-pair receptacle and, with the lever handle in its open position, are positioned to allow insertion of the removable transceiver module into the rail-pair receptacle.

2. The removable transceiver module of claim 1, wherein the rail-pair receptacle is an open structure attached to system board.

3. The removable transceiver module of claim 1, comprising guides located at both sides of the base frame to be inserted in respective guide rails in the rail-pair receptacle.

4. The removable transceiver module of claim 1, wherein the lever handle comprises protrusions that, with the removable transceiver module fully inserted into the rail-pair receptacle and the lever handle in its closed position, abut against the rail-pair receptacle retaining the removable transceiver module.

5. The removable transceiver module of claim 1, comprising a lever handle spring to maintain the lever handle in the open position.

6. The removable transceiver module of claim 1, comprising retention elements to, with the removable transceiver module fully inserted into the rail-pair receptacle, maintain the lever handle in the closed position.

7. The removable transceiver module of claim 1, comprising a front cover at least partially covering the base frame and fitting into an opening of a system faceplate in which the removable transceiver module is installed.

8. A system comprising:
a system board comprising a first connector;
a rail-pair receptacle attached to the system board and at least partially surrounding the first connector;
a removable transceiver module comprising a base frame installable in the rail-pair receptacle, a module base board and a second connector attached thereto and a lever handle pivotally attached to the base frame and coupled to the module base board;
wherein the removable transceiver module is to be installed in the rail-pair receptacle in response to a lateral movement of the base frame with respect to the rail-pair receptacle to align the second connector with the first connector;
wherein the lever handle is movable between a closed position to couple the second connector to the first connector and an open position to allow the installation of the removable transceiver module into the rail-pair receptacle, the lever handle determining a vertical move of the module base board between the closed position and the open position;
wherein the lever handle is a U-shaped lever handle having two free ends and the lever handle is pivotally attached to the base frame by the two free ends;
wherein the U-shaped lever handle comprises:
one arm located at each side of the base frame, each arm having one free end that is pivotally attached to the base frame; and
an actuating portion joining both arms by their opposite end; and
wherein the lever handle comprises protrusions and the rail-pair receptacle comprises respective first recesses such that, with the removable transceiver module fully inserted into the rail-pair receptacle and the lever handle in its closed position, the protrusions are inserted into the first recesses and the protrusions abut against side walls of the first recesses to retain the removable transceiver module.

9. The system of claim 8, wherein the removable transceiver module comprises guides located at both sides of the base frame and the rail-pair receptacle comprises respective guide rails in which the guides are to be inserted.

10. The system of claim 8, wherein the lever handle comprises projections that, with the lever handle in its closed position, are positioned to abut against the rail-pair receptacle avoiding insertion of the removable transceiver module into the rail-pair receptacle and, with the lever handle in its open position, are positioned substantially parallel to an upper surface of the rail-pair receptacle allowing insertion of the removable transceiver module into the rail-pair receptacle.

11. The system of claim 10, wherein the upper surface of the rail-pair receptacle comprises second recesses to, with the removable transceiver module fully inserted into the rail-pair receptacle and the lever handle in its closed position, house the projections of the lever handle.

12. The system of claim 8, wherein the removable transceiver module comprises a front cover at least partially covering the base frame and a lever handle spring to maintain the lever handle in the open position, wherein the lever handle spring is located in a cavity defined by the front cover and the base frame.

13. The system of claim 12, wherein the front cover and the base frame fit into an opening of a system faceplate in which the removable transceiver module is installed.

14. The system of claim 8, wherein the removable transceiver module comprises retention elements that define an inwardly position that allows the lever handle to freely move between its first and open position and a retention position in which the lever handle is retained in its closed position.

15. The system of claim 14, wherein the retention elements are actuated by a preloaded spring that apply a force on the retention elements to maintain the retention elements in their retention position.

* * * * *